United States Patent [19]

Peterson et al.

[11] Patent Number: 5,121,037

[45] Date of Patent: Jun. 9, 1992

[54] CIRCULAR ZIG-ZAG SCAN VIDEO FORMAT

[75] Inventors: C. Glen Peterson; Charles M. Simmons, both of Los Alamos, N. Mex.

[73] Assignee: The United States of America as represented by the United States Department of Energy, Washington, D.C.

[21] Appl. No.: 672,983

[22] Filed: Mar. 21, 1991

[51] Int. Cl.⁵ .............................................. H01J 29/78
[52] U.S. Cl. ................................................. 315/378
[58] Field of Search ............................ 315/378; 358/217

[56] References Cited

U.S. PATENT DOCUMENTS 3,593,286  7/1971  Altman .
3,659,142  4/1972  Phillips .
3,662,102  5/1972  Herndon .

*Primary Examiner*—Theodore M. Blum
*Attorney, Agent, or Firm*—Milton D. Wyrick; Paul D. Gaetjens; William R. Moser

[57] ABSTRACT

A circular, ziz-zag scan for use with vidicon tubes. A sine wave is generated, rectified and its fourth root extracted. The fourth root, and its inverse, are used to generate horizontal ramp and sync signals. The fourth root is also used to generate a vertical sync signal, and the vertical sync signal, along with the horizontal sync signal, are used to generate the vertical ramp signal. Cathode blanking and preamplifier clamp signals are also obtained from the vertical sync signal.

5 Claims, 6 Drawing Sheets

CIRCULAR ZIG-ZAG SCAN VIDEO FORMAT

The invention is a result of a contract with the Department of Energy (Contract No. W-7405-ENG-36).

BACKGROUND OF THE INVENTION

The invention relates to the field of television video scanning techniques and, more specifically to circular scan video formatting.

Throughout science, there are numerous processes in which data is acquired through the use of video cameras. In such applications, it is often necessary that the data be acquired within a very limited period of time. This is perhaps most important in the area of nuclear device testing, where a camera has a few milliseconds to record data before the camera is destroyed. In this situation, fast data readout is extremely important.

The conventional method of scanning a video tube is a square format, and involves reading data in one direction of a horizontal scan line, and then flying back before reading the next horizontal line. The time required for the flyback is approximately 10% of the total frame time.

Additionally, the conventional square scanning technique overscans the round target area of the vidicon camera tube in order to scan the total area of the target. This means that approximately 22% of the frame time is wasted.

In the conventional camera scanning system, a sawtooth waveform is used for horizontal deflection. The problem with a sawtooth wave is that a significant portion of data is lost due to electrical noise generated by the strong magnetic fields required for horizontal flyback. The present invention solves these problems by providing a circular scan for a camera vidicon which saves over 30% of frame time, reduces noise, reduces dead time, and captures all data because there is no flyback due to bi-directional scanning.

It is therefore an object of the present invention to provide apparatus for the circular zig-zag scanning of vidicon tubes, obviating flyback.

It is a further object of the present invention to provide apparatus for saving frame time in a vidicon by providing a circular scan in a zig-zag pattern, by not overscanning the round vidicon tube.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention for generating a circular scan for vidicon tubes comprises sine wave means for generating and outputting a sine wave with rectifier means receiving the sine wave for rectifying the sine wave and outputting the rectified sine wave. Root extraction means receive the rectified sine wave for extracting and outputting a fourth root of the rectified sine wave. Inverting amplifier means receive the fourth root for inverting, amplifying, and outputting positive and negative reference voltages. Triangle wave generating means receive said positive and negative reference voltages and said fourth root for generating and outputting a square wave as a horizontal sync signal and a triangle wave as a horizontal ramp signal. Vertical sync generating means receive the fourth root for generating and outputting a pulse as a vertical sync signal, and as a reset signal when the fourth root has a voltage less than a predetermined DC voltage. And staircase generator means receive the reset signal and the square wave for generating and outputting a staircase ramp as a vertical ramp signal.

In a further aspect of the present invention, and in accordance with its objects and purposes, a method of reducing video camera frame time in a video camera employing a vidicon tube having a circular active area comprises the steps of generating a bi-directional scan to eliminate horizontal flyback, and maintaining the bi-directional scan in a circular format to scan only the circular active area of the video tube.

In a still further aspect of the present invention, and in accordance with its objects and purposes, a method of producing a circular zig-zag scan for a vidicon tube comprises the steps of generating and outputting a sine wave, and rectifying and outputting the sine wave. Then a fourth root of the rectified sine wave is calculated. Next, positive and negative reference voltages are calculated from the fourth root of the rectified sine wave. Finally, a triangle wave output as a horizontal ramp signal and a square wave output as a horizontal sync signal are generated from the fourth root of the rectified sine wave and the positive and negative reference voltages.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides a circular zig-zag scan for the vidicon tube of a video camera, which, as there is no flyback and no overscanning, as is common to a square format scan, provides a great reduction in frame time. To accomplish this, the invention provides a horizontal deflection which is a frequency and amplitude modulated triangular wave, and a vertical deflection which is a staircase wave, generating a step for each line.

It has been found that the field time of a video camera can be reduced by scanning the video tube in a zig-zag fashion with a circular format. The fact of this reduction can be seen in the following equation:

$$t_{cir} = t_{sq} \times (area_{cir}/area_{sq}) \times K \qquad 10$$
$$= t_{sq} \times 0.78 \times 0.87 (typical)$$
$$= t_{sq} \times 0.68$$

where K=1-(time saved by flyback elimination/$t_{sq}$)

The ideal waveforms for implementing the present invention will scan a vidicon tube in a circular zig-zag format at a constant beam velocity with evenly spaced lines. The horizontal deflection will be a triangle wave which is both amplitude and frequency modulated. With a constant slope, the amplitude modulation will determine the frequency modulation. The vertical deflection will be a staircase ramp, generating a step for each line.

To characterize these waveforms, it is first necessary to determine the length (or peak deflection) of any line within the field. This is given by the following equation:

$$L = 2\sqrt{r^2 - (r - nx)^2} \qquad 20$$

where L=length of a line, r=radius of the circular scan, x=line spacing, and n=number of the line.

From this, the temporal position of any given line can be determined. This quantity is given by the following equation:

$$\Delta t/t_{field} = \Sigma 2\sqrt{r^2 - (r - nx)^2} / \Sigma 2\sqrt{r^2 - (r - nx)^2} \qquad 30$$

where i=number of given line and max=total number of lines.

Figure 1:
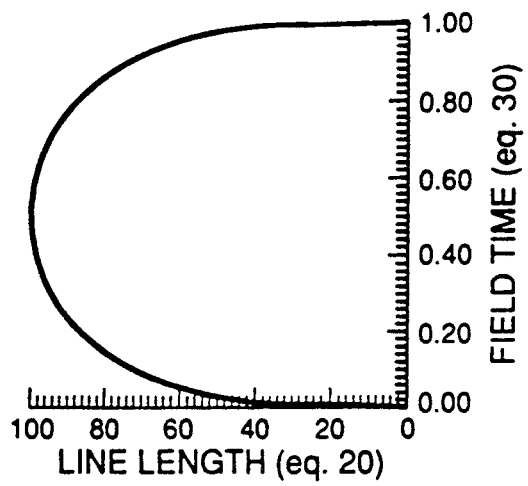
FIG. 1 is a plot of the horizontal deflection envelope according to the present invention.
Figure 2:
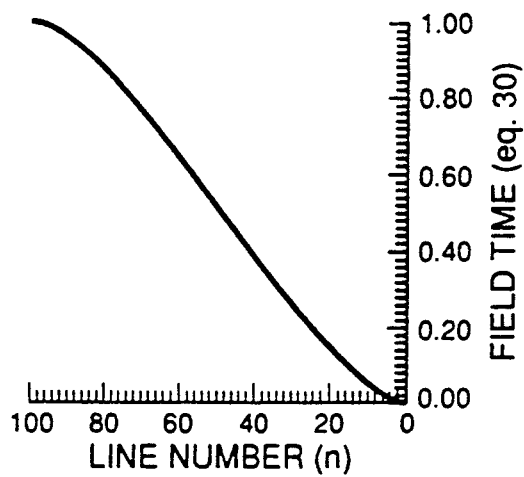
FIG. 2 is a plot of the vertical deflection waveform according to the present invention.
Figure 3:
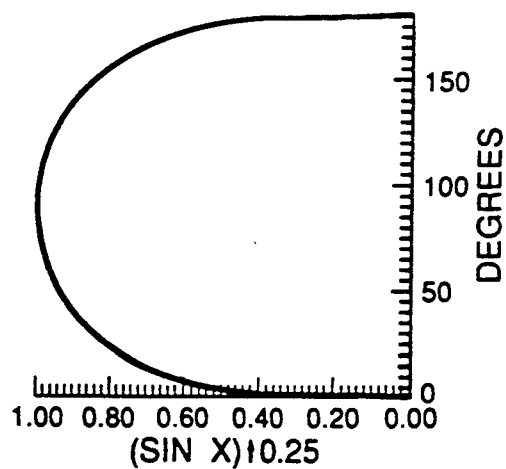
FIG. 3 is a plot of the function $(\sin x)^{.25}$ indicating that $(\sin x)^{.25}$ is a close approximation to the horizontal deflection envelope of FIG. 1.

When equation 20, which is proportional to amplitude, is plotted as a function of equation 30, which is proportional to time, the curve illustrated in FIG. 1 is obtained. It is easy to see from this curve that a close approximation is $(\sin x)^{.25}$. When line number, n, is plotted as a function of equation 30, the curve illustrated in FIG. 2 is obtained. This is the vertical deflection waveform. To illustrate that $(\sin x)^{.25}$ is an excellent approximation of the horizontal deflection envelope illustrated in FIG. 1, a plot of $(\sin x)^{.25}$ versus degrees is illustrated in FIG. 3.

Figure 4:
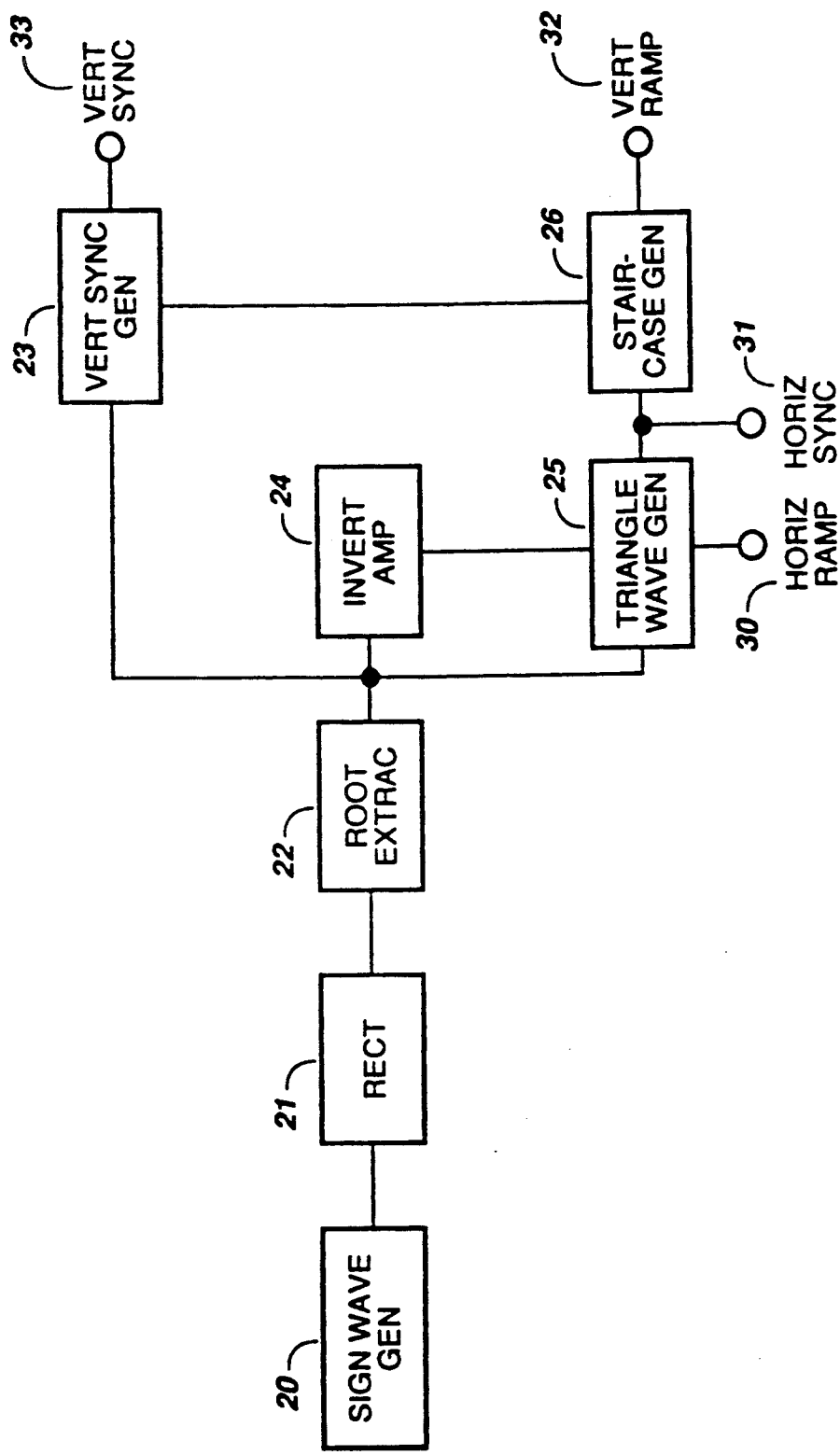
FIG. 4 is a block diagram representing the functions involved in the present invention.

A block diagram illustrating the method for generating these waveforms for implementing the invention in a conventional video camera is illustrated in FIG. 4, under the assumption that $(\sin x)^{.25}$ is an excellent approximation of the desired waveform. In FIG. 4, sine wave generator 20, a weinbridge oscillator, produces and outputs a sine wave to rectifier 21, where the sine wave is rectified. The rectified sine wave output of rectifier 21 is provided to root extractor 22.

Root extractor 22 takes the fourth root of its input, the rectified sine wave. To accomplish this, the circuit of root extractor 22 determines the logarithm of the input voltage, divides the logarithm by 4, and then takes the antilogarithm of the result. This fourth root is output from root extractor 22 to inverting amplifiers 24, and output from inverting amplifiers 24 as positive and negative reference voltages to triangle wave generator 25. These positive and negative reference voltages are used as described below to determine the positive and negative excursions of the triangle wave signal.

Triangle wave generator 25 consists of two comparators used to set the positive and negative peaks of the desired triangle wave signal from the positive and negative reference signals received from inverting amplifiers 24, and an amplifier which integrates the squarewave generated by one of the comparators. Output from triangle wave generator 25, as shown in FIG. 3, includes the triangle wave output as horizontal ramp 30, and the squarewave output as horizontal sync 31.

The square wave signal output at horizontal sync 31 is also routed to staircase generator 26 where it is utilized to generate the staircase ramp for vertical deflection which is output at vertical ramp 32. This is accomplished by differentiating the squarewave output from triangle wave generator 25, and then using this signal to pump staircase generator 26, resulting in an equal step for each horizontal line irrespective of the frequency of the horizontal lines, which is output at vertical ramp 32.

Staircase generator 26 requires a reset at the end of each field. This reset pulse is generated by vertical sync generator 23. To generate the reset pulse, a comparator within vertical sync generator 23 compares the output of root extractor 22 with a preset DC voltage. With the voltage of the output of root extractor 22 less than the level of the DC voltage, the output of vertical sync generator 23 is high and is output as vertical sync 33 to staircase generator 26. This reset pulse from vertical sync generator 23 is also used for the conventional video functions of frame sync, cathode blanking, and preamp clamp.

The waveforms required to create the zig-zag scan of circular format according to the present invention can be generated by using analog circuit techniques. One circuit embodiment for performing the functions described above is illustrated schematically in FIG. 5.

Figure 5:
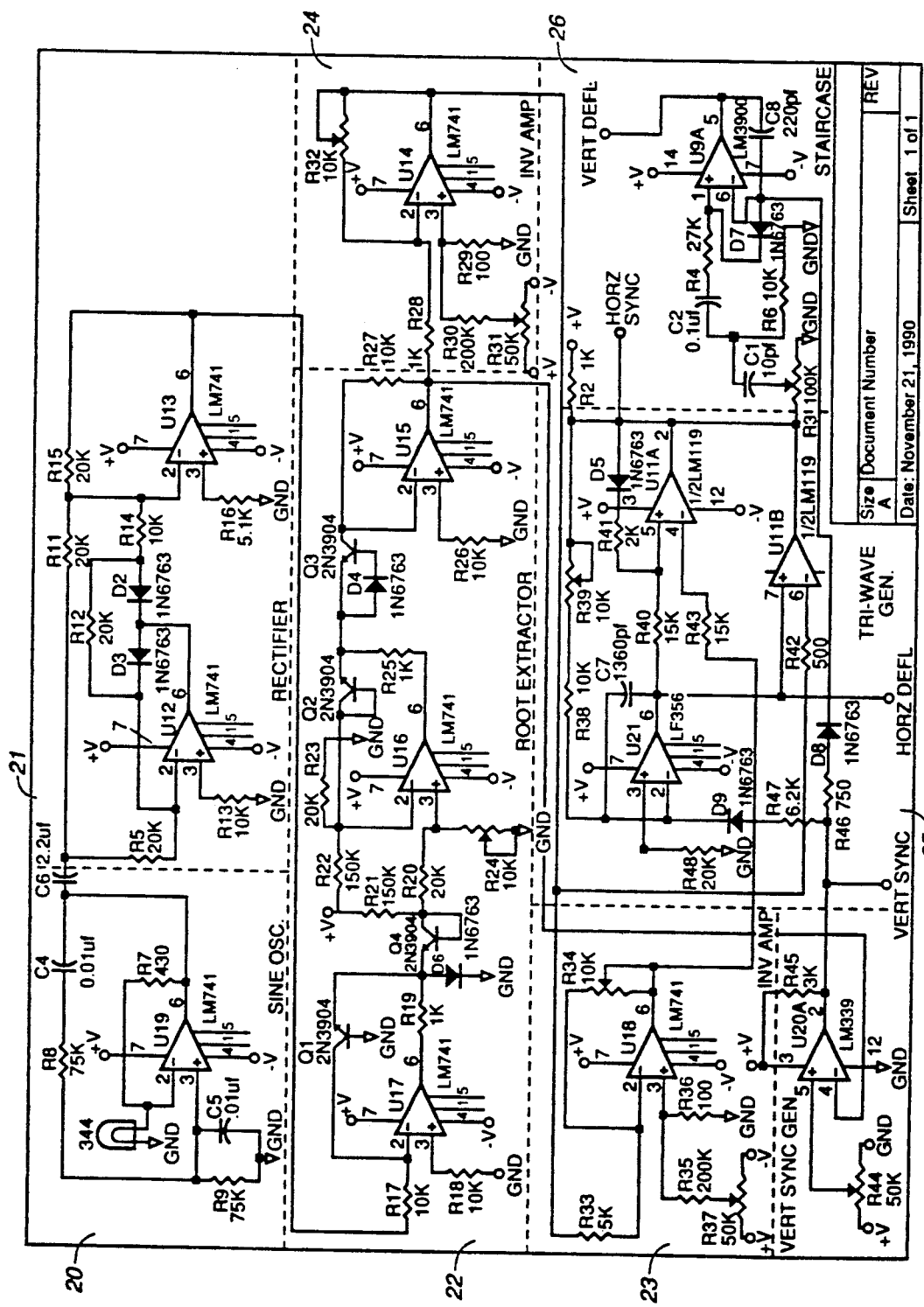
FIG. 5 is a schematic diagram of one embodiment of the present invention for producing a zig-zag scan.

The circuit illustrated in FIG. 5 is separated by dashed lines, with dashed lined boxes numbered to correspond with the numbering of the functional block diagram of FIG. 4. Individual components in FIG. 4 are clearly labeled, and need little additional explanation. However, it should be explained that lamp 40 within sine wave generator 20 serves to regulate the amplitude of the generated sine wave. Also, where V+ and V− are indicated as voltages, the voltage can range between 5 and 15 volts.

The derived function, $(\sin x)^{.25}$, has proved to be an excellent approximation of the desired horizontal envelope. The circuit illustrated in FIG. 5 has demonstrated high linearity at sweep rates in excess of 400 lines in a 1.0 ms field.

Figure 6:
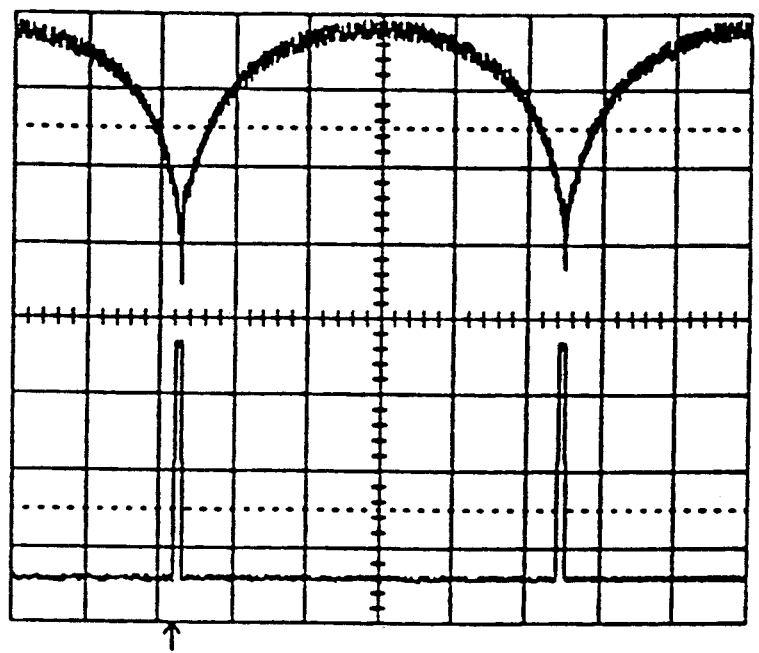
FIG. 6 is a plot of the root extractor output (upper trace) compared to the vertical sync signal (lower trace).

Waveforms for several of the signals produced by the circuit shown in FIG. 4 are illustrated in FIGS. 6-9. In FIG. 6, a dual plot of the output of root extractor 22 (upper trace), and the vertical sync pulse output from vertical sync generator 23 (lower trace) (FIG. 3) is illustrated on a common time scale. The timing of the vertical sync pulses with relation to the root extractor output should be noted.

Figure 7:
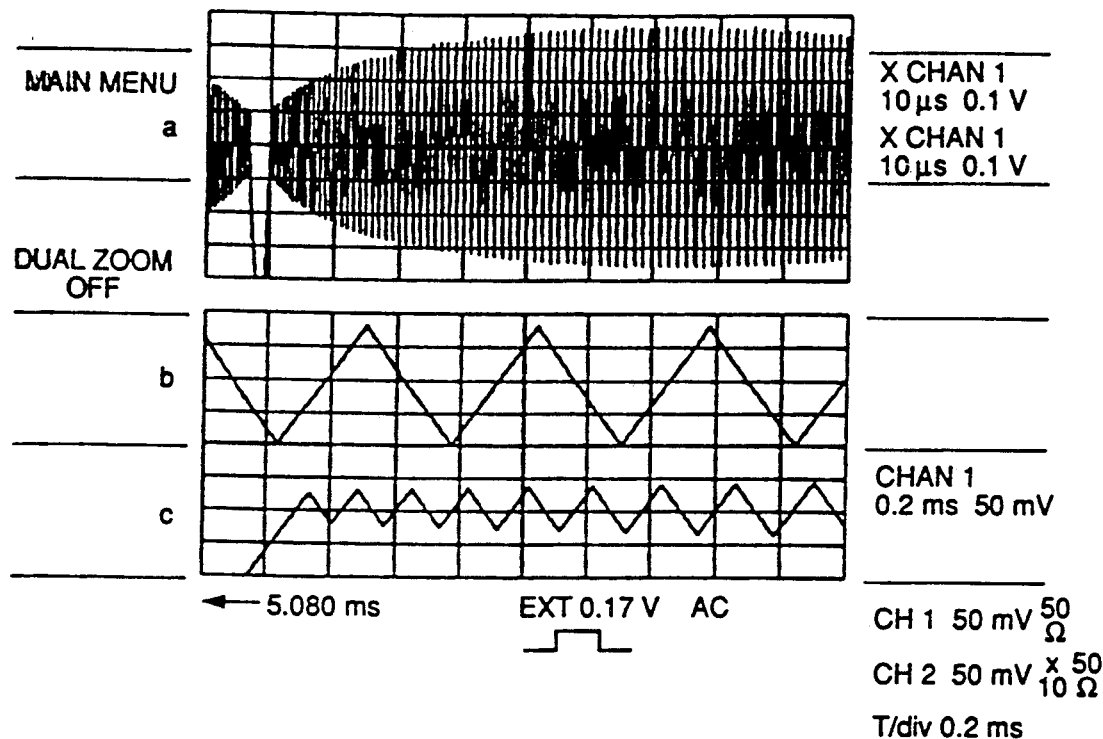
FIG. 7 is a plot of the horizontal ramp signal for differing time scales.

In FIG. 7, the horizontal ramp output of triangle wave generator 25 (FIG. 4) is illustrated for different time scales. FIG. 7 at (a) shows the amplitude modulation of the triangle wave. FIG. 7 at (b) and (c) illustrate expansions of the basic triangular nature of the center of the field and the beginning of the field respectively.

Figure 8:
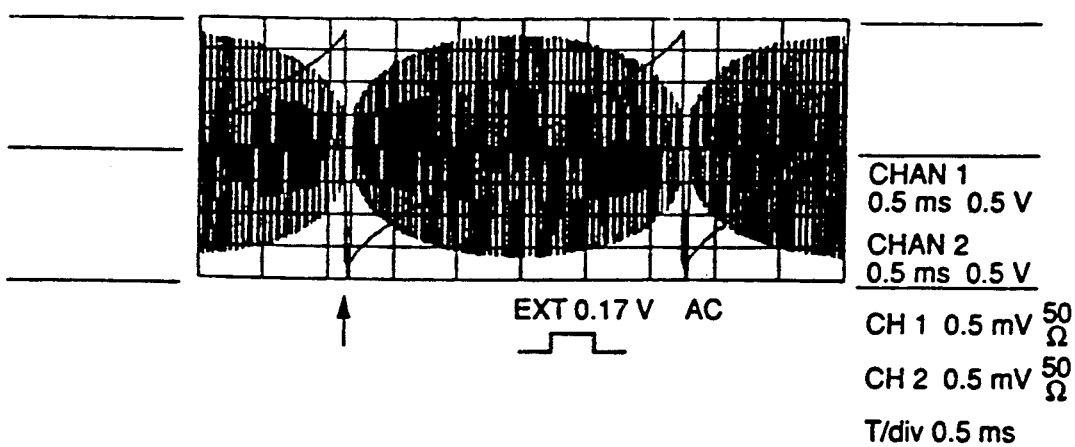
FIG. 8 is a plot of the vertical ramp signal superimposed over the horizontal ramp signal.

FIG. 8 contains a superimposition of the vertical deflection output of staircase generator 26 (FIG. 4) onto the horizontal deflection signal output from triangle wave generator 25 (FIG. 4). The temporal relationship of these signals is readily apparent from FIG. 8.

Figure 9A:
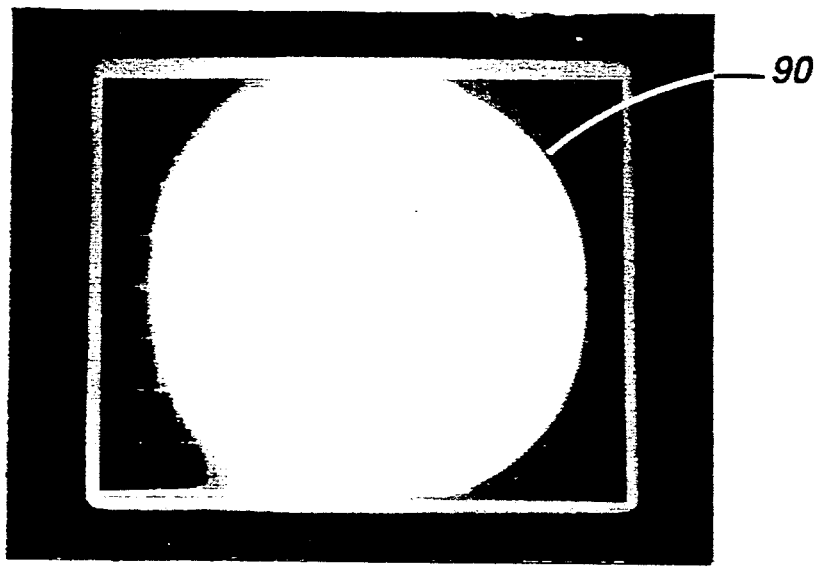
FIGS. 9a and 9b show two photographs illustrating at (a) the circular trace of the present invention and at (b) the trace of (a) expanded vertically to clearly show the detail of the zig-zag scan.
Figure 9B:
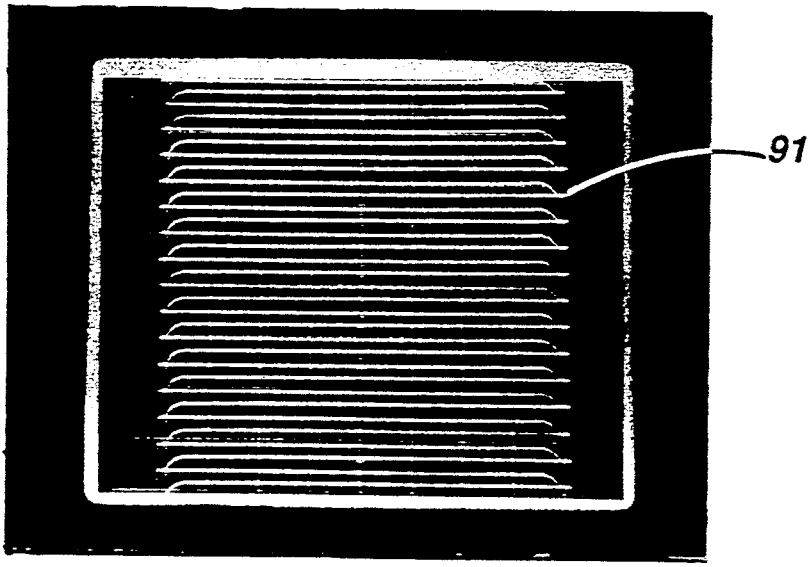

FIG. 9 contains photographs of oscilloscope traces of the combined horizontal and vertical deflection signals displayed in the X-Y mode. In FIG. 9 at (a), the circular format of scan 90 is evident, resulting in efficient scanning of the vidicon tube. In FIG. 9 at (b), scan 90 of FIG. 9 at (a) is expanded vertically to clearly show the two direction scanning, eliminating the time consuming flyback of conventional scanning techniques. FIG. 9 at (b) indicates the equal step between each horizontal line 91 produced by staircase generator 26 (FIG. 4) irrespective of the frequency of the horizontal scan lines 91.

In order to display the video output of a video camera scanned with the present invention, the video monitor must also be driven with the waveforms of the present invention so that it maintains the correct temporal and spatial position of the video data. Experience with use of the present invention has demonstrated sweep rates of 400 lines in a 1.0 ms field, with frame time reductions of approximately 30%. This has been done with no loss of resolution or dynamic range, and with no increased video bandwidth requirements.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for generating a circular scan for vidicon tubes comprising:
   sine wave means for generating and outputting a sine wave;
   rectifier means receiving said sine wave for rectifying said sine wave and outputting said rectified sine wave;
   root extraction means receiving said rectified sine wave for extracting and outputting a fourth root of said rectified sine wave;
   inverting amplifier means receiving said fourth root for inverting, amplifying, and outputting positive and negative reference voltages;
   triangle wave generating means receiving said positive and negative reference voltages and said fourth root for generating and outputting a square wave as a horizontal sync signal and a triangle wave as a horizontal ramp signal;
   vertical sync generating means receiving said fourth root for generating and outputting a pulse as a vertical sync signal, and as a reset signal when said fourth root has a voltage less than a predetermined DC voltage; and
   staircase generator means receiving said reset signal and said square wave for generating and outputting a staircase ramp as a vertical ramp signal.

2. The apparatus according to claim 1, wherein said vertical sync signal is further output as a cathode blanking signal and as a preamplifier clamp signal.

3. The apparatus according to claim 1, wherein said triangle wave generator uses said positive and negative reference voltages to limit the positive and negative excursions of said triangle wave.

4. The apparatus according to claim 1, wherein said staircase generating means uses said horizontal sync signal to produce an equal step for each horizontal scan line without irrespective of the frequency of said horizontal scan lines.

5. A method of producing a circular zig-zag scan for a vidicon tube comprising the steps of:
   generating and outputting a sine wave;
   rectifying and outputting said sine wave;
   calculating a fourth root of said rectified sine wave;
   generating positive and negative reference voltages from said fourth root of said rectified sine wave;
   generating a triangle wave output as a horizontal ramp signal and a square wave output as a horizontal sync signal from said fourth root of said rectified sine wave and said positive and negative reference voltages.
   generating and outputting a vertical sync signal and a reset signal from said fourth root of said rectified sine wave when said fourth root has a voltage less than a predetermined DC voltage; and
   generating and outputting a staircase wave as a vertical ramp signal from said horizontal sync signal; and
   resetting said vertical ramp signal on receipt of said reset pulse.

* * * * *